April 25, 1939. F. BUDIG 2,155,468
FLAPPING WING SYSTEM
Filed Aug. 22, 1936 3 Sheets-Sheet 1
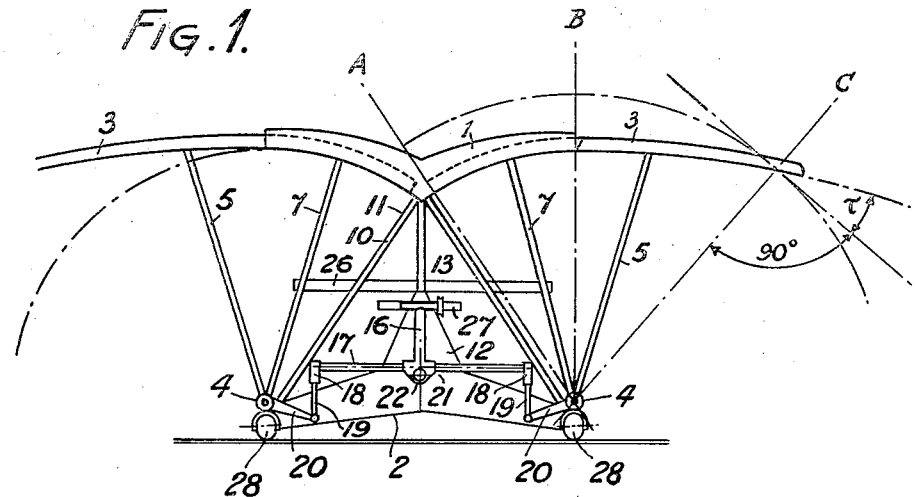
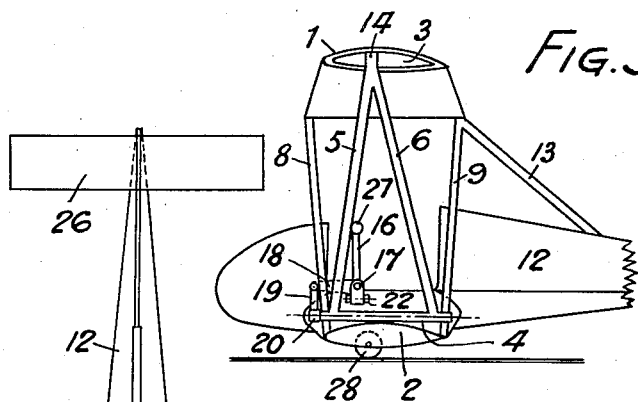
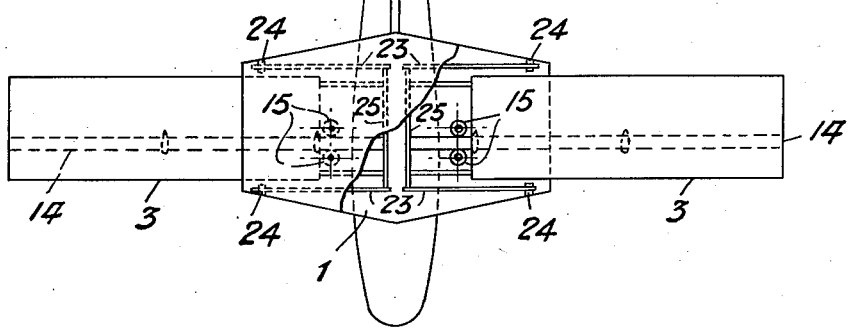
INVENTOR:
Friedrich Budig
BY HIS ATTORNEYS April 25, 1939.  F. BUDIG  2,155,468
FLAPPING WING SYSTEM
Filed Aug. 22, 1936  3 Sheets-Sheet 2

INVENTOR:
Friedrich Budig
BY HIS ATTORNEYS

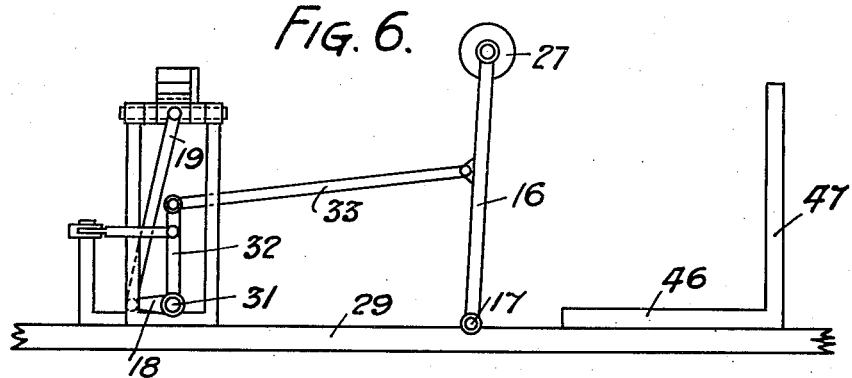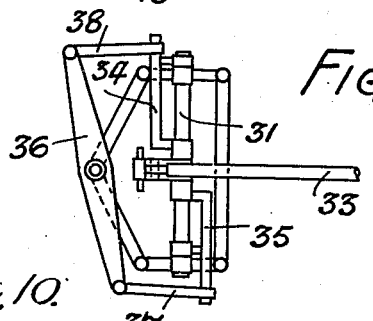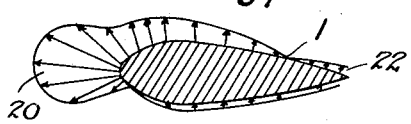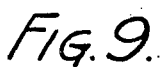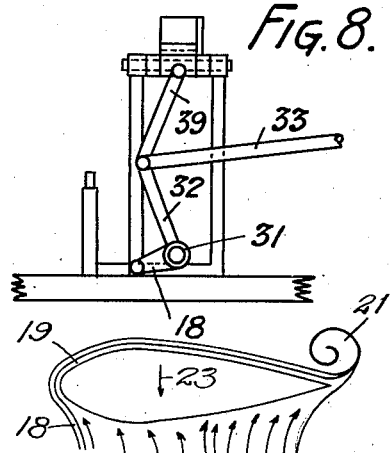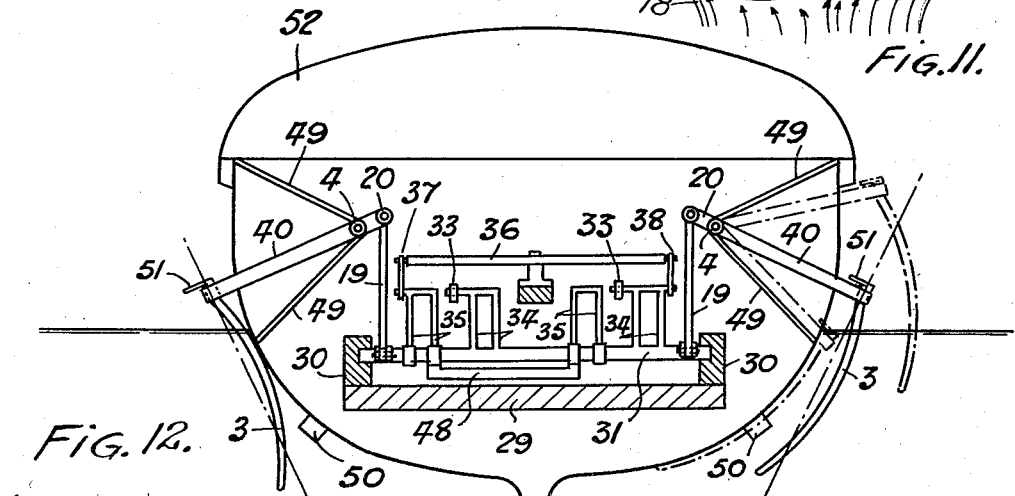

Patented Apr. 25, 1939

2,155,468

UNITED STATES PATENT OFFICE 2,155,468

FLAPPING WING SYSTEM

Friedrich Budig, Marlow, England

Application August 22, 1936, Serial No. 97,465
In Germany August 24, 1935

4 Claims. (Cl. 244—22)

The present invention relates to a flapping wing system making use of the effect of oblique attack for producing propulsion for water vehicles or for producing propulsion and lifting force for aircraft. This effect of oblique attack has been described i. e. in "Zeitschrift fuer Flugtechnik und Motorluftschiffahrt" 1930, pages 245–249, and mentioned in "Aircraft Engineering" May, 1933, page 108.

An object of the invention is to provide for a flapping wing system, comprising at least one pair of curved wings or blades and a mechanism for imparting oscillating movement to each of such wings or blades about an axis radially spaced from such wings or blades and extending substantially in the direction of drive, an improved curvature of the wings or blades.

Another object of the invention is to provide fixed hollow supporting wings in the interiors of which the inner portions of the operating wings or blades may be retracted and protruded, when actuated. The wings or blades are supported by means of guides arranged within the fixed wing.

For aircraft the pivots of the operating wings are arranged at the ends of wing-like members to which the wheels or the floats may be fitted. Further objects of the invention comprise improvements in the driving mechanism and in increasing the action of the flaps in water for the purpose of moving in curves, stopping, reversing, landing on the bank and coming alongside a jetty or a ship.

The invention is illustrated by way of example in the accompanying drawings in which:

Fig. 1 shows an aircraft with flapping wings in end elevation,

Fig. 2 the same aircraft in plan, and

Fig. 3 a side elevation of the flapping device.

Fig. 6 is a side view of the driving mechanism for water vehicles, and

Figure 4:
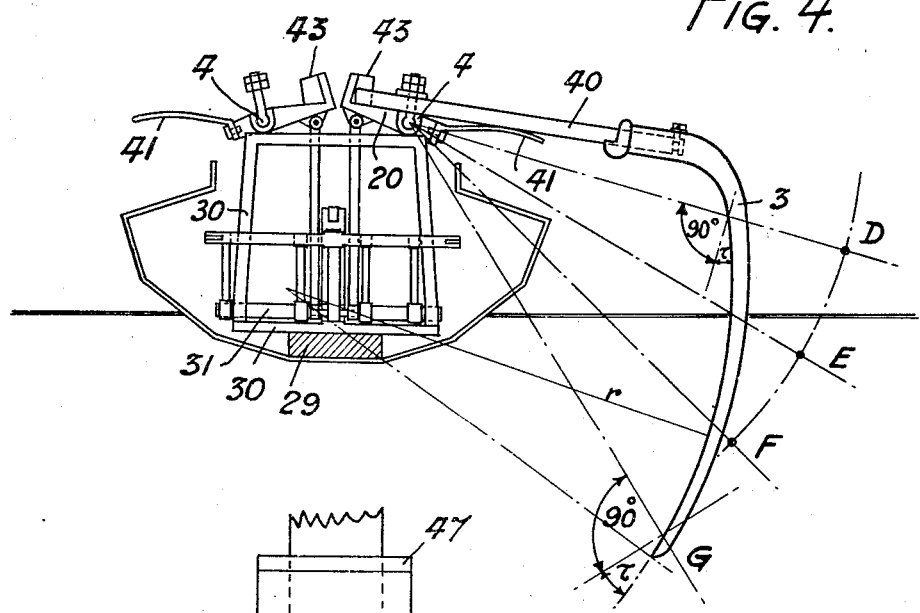
Fig. 4 is a front view of driving or propelling mechanism for water vehicles.

Fig. 7 a plan view of the same with treadles moved outwards.

Fig. 8 is a side view with connecting rods forming a toggle system.

Fig. 9 shows a larger vessel with adjacent rows of seats for the crew and with operating blades adapted to be folded against the hull of the boat and adjustable for reversing movement.

Figs. 10, 11 and 12 are diagrammatic illustrations of the directions of forces acting on the operating blades.

The supporting means for the ornithopter or flapping wing aircraft (Figs. 1 to 3) comprises two fixed supporting wings 1, 2 and the operating wings 3. By means of the pivots 4, V-struts 5, 6 and single struts 7 these operating wings, which serve also as supporting wings, are movably supported on the tips of the wings 2. The upper supporting wing 1 is connected to the lower wing 2 by the struts 8, 9, 10, 11 and to the fuselage 12 by the struts 13. The operating wings 3 extend with their inner portions from both sides into the interior cavity of the wing 1, the operating wing spar 14 sliding between the rollers 15 mounted on the wing 1. The operating wing spar 14, the V-struts 5, 6 and the rollers 15 take up the forces tending to turn the operating wings 3.

The sub-division of the supporting means into fixed and movable wings, of which the latter are supported and carried by the former, ensures for the present aircraft great stability with minimum weight and minimum air resistance. Compared with the known arrangement of operating wings according to German Patent 608,521 the variable gap between the wings, which would be present on movement of the wings if the fixed wing 1 were not provided, is bridged. The provision of fixed wings also permits the use of smaller operating wings. It is thus possible to make the operating wing surface sufficiently small for these parts to be moved without power driven means, i. e. solely by the muscular effort of the aviator.

The sliding of the inner portions of the operating wing into the interior of a fixed supporting wing is rendered practicable by curving each of these ends in the form of an arc of a circle. Such arc has as its center the pivotal axis 4. The curvature of the operating wing is differentiated from the previous arrangement in respect that the elements no longer have along the entire span of the wing a uniform angle of the curvature $\tau$, in the plane of oscillating movement, it being understood that the angle $\tau$ at any point of curvature of the operating wing is the angle between the tangent to the curve and the tangent to the circle produced by the touching point of the first mentioned tangent, when the wing is oscillating (Fig. 1). In the construction according to German Patent 608,521 large angles of the curvature are necessary, since in that case the whole supporting means is set in motion. In the present instance Fig. 1 shows the new course of the angle $\tau$. In the sector A—B the angle is zero (circular arc instead of spiral). From the line B the alteration of the angle commences; in contrast with the spiral it increases at this point, preferably uniformly, to the tip of the wing. At the line C it attains a dimension of 25° to 30°.

Experiments have been carried out with operating wings in water regarding the effect of this new variation of the angle of the curvature $\tau$. As regards the propelling effect a considerable increase of the driving force has been found compared with the earlier angle of the curvature which increased inwardly to an excessive extent.

Figs. 1 and 2 illustrate the aircraft with retracted operating wings. Actuation is effected by hand by pushing and pulling the lever 16 which is provided with a handle. The lever 16 is mounted on a horizontal transverse shaft 17 which is connected by means of the levers 18 and the rods 19 by way of the levers 20 with the pivots 4.

The shaft 17 may be mounted on the aircraft in fixed bearings. It is, however, also possible to mount the bearings 21 of the shaft so as to be able to rock about the longitudinal axis 22. As a result on lateral inclination of the lever 16 asymmetric displacement of the operating wings 3 is produced, i. e., one operating wing is retracted or protruded further than the other. The control herein described of the movement of the wings, which can be effected at will, can naturally also be effected in any other suitable manner. This effect may serve for transverse control of the aircraft.

On pushing the lever 16 forward both inner portions of the operating wings are retracted into the supporting wing 1; on pulling the lever 16 both wings are protruded. The outward movement of the operating wings may, however, also be effected by elastic media, for example rubber cables 23. These rubber cables are tensioned in gliding flight or in periods of gliding flight by the lifting force of the operating wings whereby power is stored. The rubber cables are therefore not only a very important factor in flying with flapping wings operated manually but also serve as damping members in closing the operating wings. The rubber cables are secured at 24 within the supporting wing 1 and lie wholly within the supporting wing 1. The rubber cables are connected to projecting pins 25 on the operating wings.

The elevating rudder 26 is preferably actuated by a separate hand lever, which may be in the form of a rotatable handle 27. On flapping movement the elevating rudder is held in a fixed position and serves substantially as a damping means. Elevation is controlled by quicker or slower flapping of the wing. For starting and landing there are used the wheels 28, which may be replaced by longitudinally extending floats or interchanged therewith.

The actuation of the operating wings need not be limited to hand operation only. The feet may be used to assist the operation by means of pedals operatively connected to the hand lever 16. Figs. 4 to 9 illustrate this possibility.

On a longitudinal base member 29 is secured an open framework 30 which carries at its lower end the horizontal shaft 31 in bearings and at its upper end is provided with the bearings for the pivots or rock-shafts 4. The lever 32 is fixed on the shaft 31 and is mechanically connected by the connecting rod 33 with the hand lever 16. The levers 18 are also connected with the shaft 31, in that in Figs. 4 and 6, as in Fig. 1, the rods 19 connect the levers 20 with the levers 18, as a result of which actuation of the operating wings or of the operating blades 3 through the medium of the hand lever is ensured.

With the horizontal shaft 17 is therefore associated a second parallel shaft 31 on which latter are mounted the treadles or levers 34 and 35 for foot operation. Both treadles may be fixedly connected with the shaft 31, so that on pushing forward both legs a working stroke is made, but on retraction of the legs no work is done. Generally, however, it is preferable not to interrupt the operation, but to supply continuously a smaller quantity of work. For this purpose only one of the treadles, the lever 34, is fixedly connected to the horizontal shaft 31, while the lever 35 is loosely mounted on the shaft 31. Moreover, the treadles 34 and 35 are arranged to move in opposite directions by means of a lever 36 having arms of equal length mounted on a vertical shaft and push rods 37 and 38. As a result it is possible to do work with each leg in succession.

The described mechanism on each operating movement completes one stroke of the wings. The number of wing strokes per minute physically possible is therefore limited to about 80 to 90. In order to double the number of strokes per minute of the wings without increasing the number of operating movements, provision is made for mounting short rods 39, which, as shown in Fig. 8, are used in lieu of the rods 19. By the connection of the rods 39 with the lever 32 and the connecting rod 33 there is formed a toggle system which on one movement of the connecting rod 33 produces two strokes of the wings.

With the use of the toggle for doubling the number of strokes of the wings the kinetic energy of the wings becomes important, particularly at the moment when the toggle lever is in extended position. With single movements of the wing the forces can be controlled by hand as with a smith's hammer. In similar manner with double strokes of the wings the forces can be controlled, if, as in Fig. 4 the rods 40 which may be regarded as helves are rotatable about the axes 4 on the levers 20; so that the rods supported by springs may swing freely downwards with the blades and are held in normal position only by the springs 41.

This arrangement of the wing suspension with a suitable cushioned degree of freedom permits the use of double wing strokes, without any injurious action of the forces set up on the bearings and pivots of the apparatus. When the levers of the toggle pass beyond the straight or extended position, due to the action of the kinetic energy of the wing the rods 40 are released somewhat from their support, namely the levers 20, and give up at this moment the energy to the springs 41.

Figure 5:
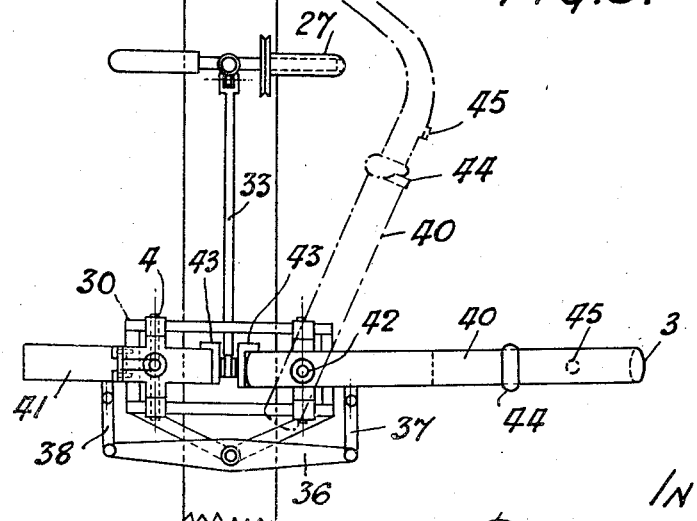
Fig. 5 is a plan view.

A second degree of freedom of the wing fastening is provided by the rearward yielding of the rods 40. This yielding of the rods protects the device on collision with any obstacle and permits the folding of the rods and of the operating blades over the boat as shown in Fig. 5. For this purpose the rods 40 are rotatably mounted on the pins 42 and are prevented from turning forward in the normal position by the projections 43. Each projection 43 is mounted on the respective lever 20. Each pin 42 can be mounted by means of lugs on the respective rock-shaft 4, so that it forms simultaneously a loose connection for the rod 40.

The operating blades 3 are rotatably mounted on the round ends of the rods in known manner, are held in the normal position by the projections 44, i. e. prevented from forward rotation, and are secured against falling out by means of screws 45 engaging grooves. The curvature of the operating blades is set for the purpose of increasing the efficiency of the operating blades with an angle of the curvature τ, decreasing inwardly. The most favourable dimension of the angle of the curvature at the outer end of the operating blade, at G, lies between 25° and 30°, the most favourable dimension of the angle of the curvature τ, at the inner end of the operating blade, at D, is between 10° and 15°. In the middle position, at E, i. e. at the water level, the angles of the curvature are 15° to 20°. The sector D—F represents the extent of the stroke.

The pilot's seat 46 and the seat-back 47 complete the driving device. Several seats may be provided one behind the other, and from there both operating blades can be actuated without structural difficulties, the provision of the double-armed lever 36 with the thrust rods 37 and 38 facilitating the co-operation of a number of boatmen in operation. It is only necessary suitably to lengthen the thrust rods 37 and 38 and to provide hand levers for the boatmen. If the thrust rods are prolonged sufficiently far forwards, then the double-armed levers between the thrust rods serve also as levers for foot operation by the other members of the crew. If one boatman sits opposite the pilot, forward shift of the double-armed lever is not necessary.

In my invention wings or blades of stream-line section are employed, and they produce forward movements both on the upward strokes and on the downward strokes of the wings or blades. These forward movements are produced by forcing the water or air laterally, a circulating stream being produced on the front edges of the wings or blades, resulting in considerable suction action on the thick front edges of the blades. At a thin rear edge of a blade, on each movement of a blade, an eddy is produced which, on reversal of the direction of the stroke of a blade, is forced rearwards, and for this reason supplements the circulation stream around the front edge of the blade.

In aircraft the upward movements are produced by the curvature of the wings or blades, there being more power exerted on the downward movements of the wings or blades than on the upward movements, as will be obvious.

By virtue of the provision of the horizontal shafts 17 and 31 it is rendered possible to use the new device in many ways. The same feature leads to greater rigidity of the device with small weight, as the driving shaft lies in the plane of the seat.

With larger boats or aircraft it is also possible to construct the same arrangement for two boatmen or pilots sitting side by side, so that boatmen or pilots disposed behind one another in a double row of seats of the boat can actuate the driving mechanism. Fig. 9 illustrates this possibility in a life-boat or a fishing boat, seen from the rear. The simultaneous co-operation of two boatmen sitting side by side is obtained by means of the horizontal shaft 31 and by means of the connection of the loose foot lever 35 through the rigid coupling 48.

In larger boats naturally other circumstances may be important for the arrangement of the operating blades. In consequence of the available space for the rods 40 and the mechanism the operating blades need not be spaced so far from the hull of the boat as with small boats. Also the depth of immersion of the boat is greater than that of the operating blades. The known protecting means may be dispensed with and new ones provided. The rods 40 move suitably in casings 49 on which are also arranged the pivots 4, and extend into the open through slots in the side wall of the boat. The casings 49 lie above the water level and keep sealed watertightly the slots in the side wall of the boat. The operating blades may be folded back momentarily against the sides of the boat in coming alongside other vessels and in landing on the shore and are then protected by longitudinal bars 50. The longitudinal bars 50 are interrupted at the points where the operating blades will lie, the blades occupying the interruptions.

Reversing, or turning of the boat in the seaway and wind can easily be effected by adjusting the operating blades. The operating blades are for this purpose each rotatable about an axis extending approximately perpendicularly to the respective rod 40, and can be rotated through 180° from the interior of the boat by a hand lever 51. Fig. 9 shows the left hand operating blade set for astern movement and the right hand operating blade set for forward movement so that the boat will turn in a circle. In the reversing position the efficiency of the operating blade is small, on account of abandonment of the favourable angle of the curvature τ. In such manoeuvres as turning and reversing the low efficiency is, however, not a serious objection.

The boat can be closed watertight by a roof or deck 52. Turning of the operating blades in this case can be effected for example by a worm wheel and a hand crank from the interior of the boat.

The references to the use of muscular power for actuating the operating wings referred to do not exclude the use of motive power. Other gearing for transmission of power to the operating blades or operating wings may be used. Shock absorbing means may be interposed in members of the gearing in particular with higher speeds.

What is claimed is:

1. A flapping wing system using the effect of oblique attack for producing propulsion for water vehicles or propulsion and lifting force for aircraft, comprising at least one pair of curved wings or blades, a mechanism for imparting oscillating movement to each such wing or blade about an axis radially spaced from such wing or blade and extending substantially in the direction of drive, said wing or blade being curved in such a manner that the angle of the curvature between the tangent to the circle produced by a point of the wing or blade when oscillating and the tangent to the curve at said point increases towards the free end and at least along the outer portion of said wing or blade.

2. A flapping wing system using the effect of oblique attack for producing propulsion for water vehicles or propulsion and lifting force for aircraft, comprising at least a pair of curved wings or blades, a mechanism for imparting oscillating movement to each such wing or blade about an axis radially spaced from such wing or blade and extending substantially in the direction of drive, said wing or blade being curved in such a manner that the angle of the curvature between the tangent to the circle produced by a point of the wing or blade when oscillating and the tangent to the curve at said point increases towards the free end and at least along the outer portion of said wing or blade, the mechanism being provided with means for imparting asymmetric oscillating movements to the operating wings, so that the movement of one wing of a pair differs from that of the other wing.

3. A flapping wing system using the effect of oblique attack for producing propulsion for water vehicles or propulsion and lifting force for aircraft, comprising at least one pair of curved wings or blades, a mechanism for imparting oscillating movement to each such wing or blade about an axis radially spaced from such wing or blade and extending substantially in the direction of drive, said wing or blade being curved in such a manner that the angle of the curvature between the tangent to the circle produced by a point of the wing or blade when oscillating and the tangent to the curve at said point increases towards the free end and at least along the outer portion of said wing or blade, the mechanism incorporating treadle levers mounted on a horizontal transverse shaft for imparting oscillating movements to the operating wings or blades, one of said treadle levers being fixed to said shaft and the other of said treadle levers being loose thereon, a two-armed lever and thrust rods interconnecting said levers, a second horizontal shaft, a hand-lever on said second shaft, and a connecting rod connecting said first mentioned treadle lever with said hand-lever.

4. A flapping wing system using the effect of oblique attack for producing propulsion for water vehicles or propulsion and lifting force for aircraft, comprising at least one pair of curved wings or blades, a mechanism for imparting oscillating movement to each such wing or blade about an axis radially spaced from such wing or blade and extending substantially in the direction of drive, said wing or blade being curved in such a manner that the angle of the curvature between the tangent to the circle produced by a point of the wing or blade when oscillating and the tangent to the curve at said point increases towards the free end and at least along the outer portion of said wing or blade, the mechanism incorporating treadle levers mounted on a horizontal transverse shaft for imparting oscillating movements to the operating wings or blades, one of said treadle levers being fixed to said shaft and the other of said treadle levers being loose thereon, a two-armed lever and thrust rods interconnecting said levers, a second horizontal shaft, a hand-lever on said second shaft, and a connecting rod connecting said first mentioned treadle lever with said hand-lever the thrust rods being provided with extensions with hand-grips to serve as hand-levers.

FRIEDRICH BUDIG.